UNITED STATES PATENT OFFICE.

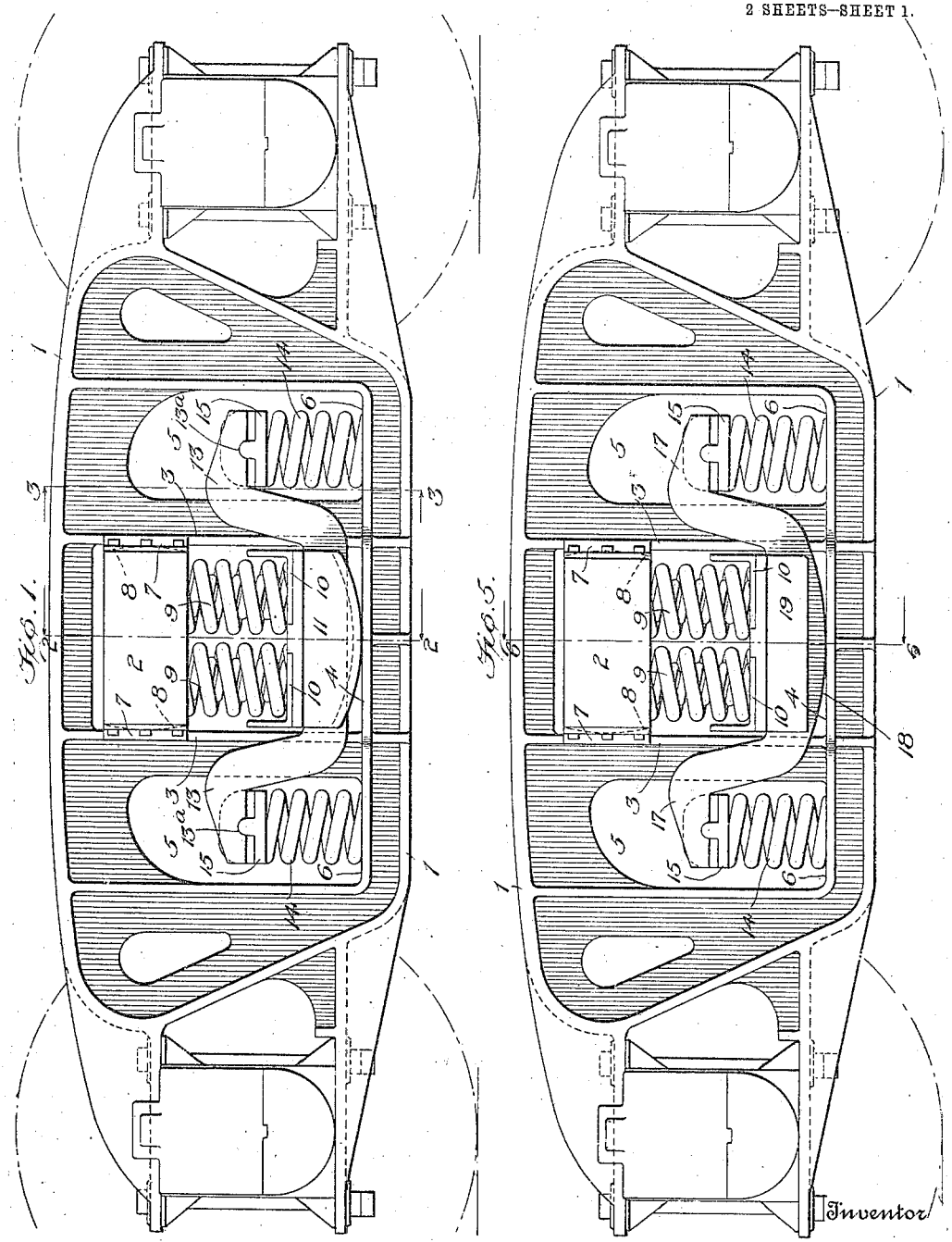

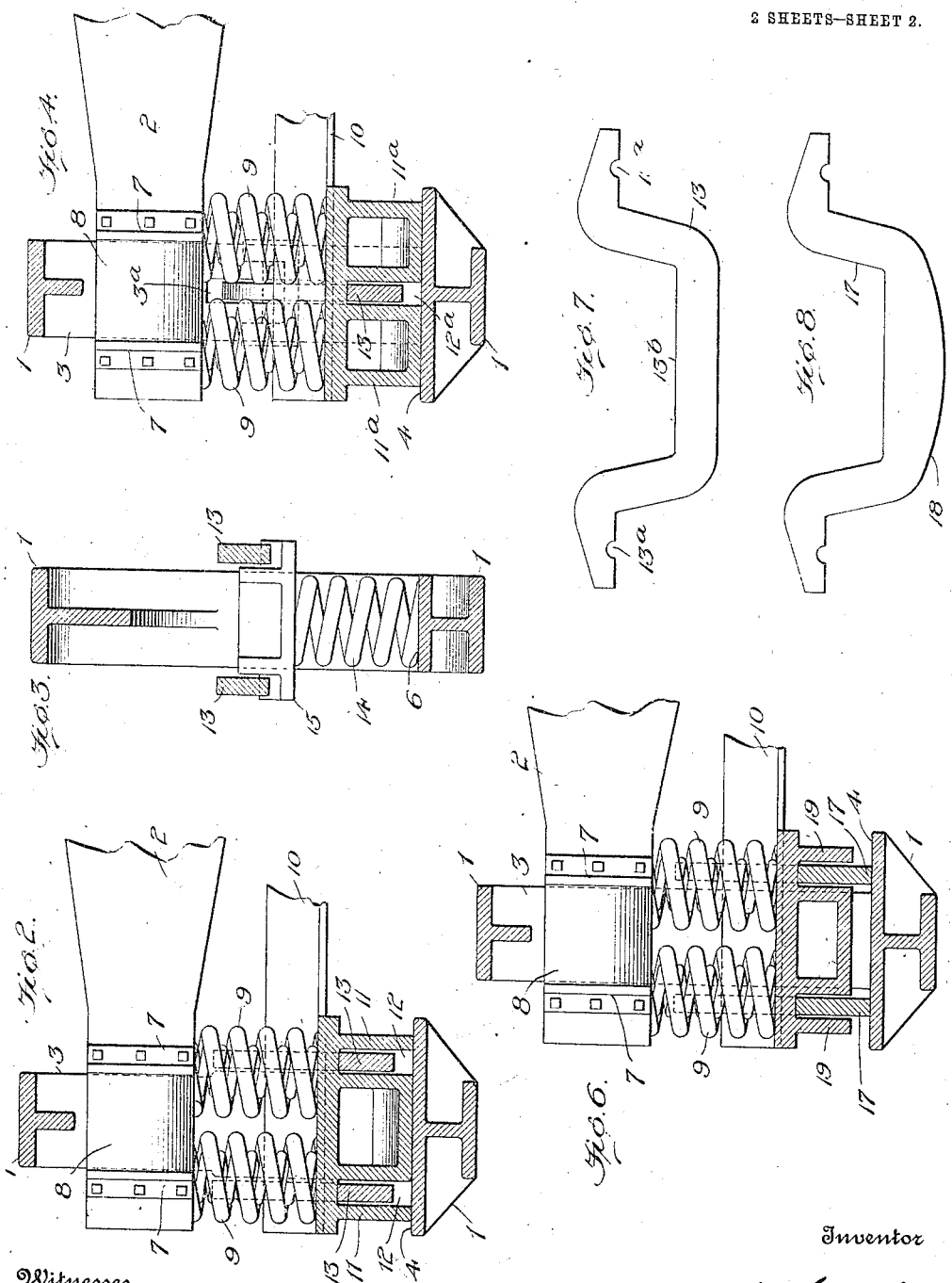

HARRY C. BUHOUP, OF CHICAGO, ILLINOIS.

CAR-TRUCK.

987,695.     Specification of Letters Patent.     Patented Mar. 28, 1911.

Application filed August 12, 1910. Serial No. 576,852.

*To all whom it may concern:*

Be it known that I, HARRY C. BUHOUP, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to the construction of trucks for railway vehicles and is particularly designed to afford a truck of this character in which the component parts are so formed and combined that the structure is one possessing great flexibility, thus prolonging the life, not only of the truck itself, but of the vehicle as a whole, by permitting the truck to readily and yieldingly accommodate itself to high and low joints and sags and inequalities in the track.

To this end, the principal feature of my invention, generally stated, consists in combining, with the side-frames of a car truck, a spring supported bolster between which and the side-frames are interposed load transmitting devices having rocking engagement with the side-frames, whereby, when the truck passes over a high or low joint in the track, the side-frames and load transmitting devices are permitted to rock upon each other.

There are other, minor, features of invention residing in particular combinations and elemental constructions, all as will hereinafter more fully appear.

In the drawings chosen for the purpose of illustrating my invention, the scope whereof is pointed out in the claims, Figure 1 is a side elevation of a car truck embodying my invention; Fig. 2 is a vertical section of a portion of the car truck, taken in the plane of the line 2—2, Fig. 1. the bolster being shown in elevation; Fig. 3 is a vertical section of a portion of the car truck, taken in the plane of the line 3—3, Fig. 1; Fig. 4 is a view corresponding to Fig. 2; but illustrating a modified form of my invention; Fig. 5 is a side elevation of a car truck illustrating a further modified form of my invention; Fig. 6 is a vertical section of a portion of the car truck illustrated in Fig. 5, the section being taken in the plane of the line 6—6, Fig. 5, and the bolster being shown in elevation. Fig. 7 is a detail elevation of an equalizer bar such as is employed in the forms of truck illustrated in Figs. 1, 2, 3 and 4; and Fig. 8 is a detail elevation of an equalizer bar such as is employed in the form of truck illustrated in Figs. 5 and 6.

Corresponding reference symbols refer to like parts wherever they occur.

I will now proceed to describe my invention more fully, so that others skilled in the art to which it appertains may apply the same. As both sides of each of the several forms of trucks illustrated are designed to be identical in construction, only one side of each form of construction will be described.

In the drawings, 1 indicates the side-frames and 2 the bolster. The side-frames may be of any suitable character, but it is preferred to form them of cast steel of general I-beam cross-section, each side-frame having a centrally disposed, preferably rectangular, bolster opening bounded by the top and bottom rails of the side-frame and by the vertically extending columns 3. As shown in Fig. 4, when but a single equalizer is employed, the columns 3 may be slotted, as at 3ª, to permit the passage of such equalizer. The bearing face or seat 4 on the side-frame at the lower end of the bolster opening, for engaging and supporting the load transmitting device so as to permit the latter to have a rocking movement relative to the side-frame, is preferably flat and of somewhat greater breadth than the upper portion of the side-frame, the rocking of the load transmitting device with respect to the side-frame being preferably provided for by forming such load transmitting device with curved bearing faces adapted to engage the seat 4. Upon opposite sides of the bolster opening the side frame is also provided with openings 5 for the reception of the equalizer springs and spring caps, the bases of these apertures forming supporting seats 6 on which the respective equalizer springs 14 rest.

The bolster 2, which projects into the bolster-openings of the side-frames and which may be maintained in proper, vertically slidable, relation therewith by means of the common form of column guides 7, may be of any desired construction; but in order that the turning or rocking movements of the side-frames 1 may not transmit any injurious twisting or torsional strains to the bolster it is preferred to round or convexly curve those lateral faces 8 of the bolster which are adjacent to the columns 3 of the side-frames. The bolster 2 may be supported to yield vertically with respect to the side-frames by means of the usual bolster springs 9. These springs transmit the load imposed upon the bolster to spring-seats to which the transversely extending spring planks 10 are preferably rigidly secured.

In the construction shown in Figs. 1, 2 and 3 the spring-seats are formed as members 11 having convexedly curved bottoms which engage and are adapted to rock upon the respective bearing seats 4 at the lower end of the bolster openings of the side-frames 1, the members 11 thereby not only performing the function of spring-seats, but also of load transmission devices for transmitting the superimposed load to the side frames. In the embodiment of my invention illustrated in the figures of the drawings last referred to, a plurality of equalizers 13 are employed and the members 11 are, therefore, preferably fashioned with a corresponding number of slots or passages 12 to receive such equalizers. As shown, the slots 12, which extend through the members 11 in a direction parallel to the side-frames, are of sufficient height to permit vertical oscillations of the equalizers 13 therein, the top walls of the slots preferably conforming to the upper faces of the adjacent portions of the corresponding equalizers 13 to constitute seats or bearings therefor as well as to limit the upward movement thereof, and the side walls of said slots serving as guides for said equalizers.

The bolster spring-seat 11$^a$ illustrated in Fig. 4 is identical in function and substantially identical in form with the bolster spring-seat 11 shown in Figs. 1, 2 and 3 and heretofore described, the only difference being that but one, centrally disposed, equalizer receiving slot 12$^a$ is required, since in this modified form of my invention a single equalizer 13 is employed. The equalizers 13, whether one, as in Fig. 4, or a plurality, as in Figs. 1, 2, and 3, be employed, are yieldingly supported on the side-frames 1 by means of springs 14 which rest upon the corresponding seats 6 of the side-frames. Between each equalizer spring 14 and the adjacent end or ends of the equalizer or equalizers 13 a rocking spring-seat 15 is preferably interposed. As shown more particularly in Figs. 1, 5 and 7, the connection of the equalizers 13 and spring-seats 15 may be conveniently maintained by forming the ends of each equalizer with cylindrically curved recesses 13$^a$ which are adapted to fit appropriate, correspondingly curved ribs formed integral with the spring-seat members 15. The equalizers 13 are preferably of yoke-like form and fashioned with a flat upper bearing surface 13$^b$ adapted to engage the load transmitting spring-seats 11 and 11$^a$ of the two forms of my invention illustrated in Figs. 1 to 4, inclusive.

The embodiment of my invention illustrated in Figs. 5, 6 and 8 is precisely like that illustrated in Figs. 1, 2 and 3, except that the equalizers 17 employed are formed with convexly curved, lower bearing faces 18 which engage and are adapted to rock upon the corresponding seats 4 of the side-frames 1, the bolster-spring-seats 19, which otherwise correspond in form with bolster spring-seats 11, being made straight along their lower faces and of decreased height, to thus permit the equalizer members 17 to function as load transmission devices for transmitting the bolster load to the side-frames. It will be observed, however, that in all constructions the load transmission means or devices, which transmit the load imposed upon the bolster to the side-frames, are adapted to have a rocking movement with respect to their respective side-frames.

When a truck constructed in accordance with my invention passes over a high or low spot in the track, the side-frame on that side will move upwardly or downwardly, as the case may be, with a turning movement, causing a compression of one or the other of the equalizer springs 14 and a rocking movement of the load transmission member on the supporting seat 4 of the side-frame, the side-frames, spring-planks, bolster and all other parts of the truck being thereby wholly relieved of all injurious twisting strains.

Having thus described my invention, what I claim and desire to secure by Letters Patent is:

1. In a car truck, the combination with side-frames, of a bolster, springs for yieldingly supporting said bolster, spring-seats for supporting said springs, and spring-planks secured to said spring-seats, said spring-seats being adapted to have a rocking movement with respect to their respective side-frames.

2. In a car truck, the combination with side-frames, of a bolster, springs for yieldingly supporting said bolster, and spring-seats for supporting said springs, said spring-seats having curved bearing faces adapted to engage and rock upon their respective side-frames.

3. In a car truck, the combination with side-frames, of a bolster, springs for yieldingly supporting said bolster, spring-seats for supporting said springs, and spring-planks rigidly secured to said spring-seats, said spring-seats having curved lower bearing faces adapted to engage and rock upon their respective side-frames.

4. In a car truck, the combination with side-frames, of a bolster, springs for yieldingly supporting said bolster, spring-seats engaging said side-frames for supporting said springs, and equalizers yieldingly supported on their respective side-frames.

5. In a car truck, the combination with side-frames each having a bolster opening therein, of a bolster, springs for yieldingly supporting said bolster, spring-seats engaging said side-frames for supporting said springs, equalizer springs arranged on opposite sides of the bolster opening of each side-frame, and equalizers yieldingly supported on the side-frames by their respective equalizer springs.

6. In a car truck, the combination with side-frames each having a bolster opening and columns, of a bolster having curved faces adjacent to said columns, springs for yieldingly supporting said bolster, and spring-seats for supporting said springs, said spring-seats engaging and being adapted to rock upon their respective side-frames.

7. In a car truck, the combination with side-frames each having a bolster opening and columns, of a bolster having curved faces adjacent to said columns, springs for yieldingly supporting said bolster, spring-seats for said springs, equalizers engaging their respective spring-seats, and equalizer springs yieldingly supporting said equalizers on their respective side-frames.

8. In a car truck, the combination with side-frames, of a bolster, springs for yieldingly supporting said bolster, spring-seats for supporting said springs, each of said spring-seats having a curved face adapted to engage and rock upon the adjacent side-frame and each of said spring-seats being also recessed to receive an equalizer, equalizers engaging said spring-seats, and springs seated upon each side-frame and yieldingly supporting their respective equalizers.

In testimony whereof I affix my signature, in presence of two subscribing witnesses.

HARRY C. BUHOUP.

Witnesses:
D. B. MASON,
H. W. STANNARD.